(12) United States Patent
Lee et al.

(10) Patent No.: US 11,525,477 B2
(45) Date of Patent: Dec. 13, 2022

(54) FRACTAL STRUCTURE FOR POWER-GENERATION OF BEARING ROTATING VIBRATION

(71) Applicant: KOREA INSTITUTE OF SCIENCE AND TECHNOLOGY, Seoul (KR)

(72) Inventors: Yong Bok Lee, Seoul (KR); Wonil Kwak, Seoul (KR); Bok Seong Choe, Seoul (KR); Jungwan Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 433 days.

(21) Appl. No.: 16/714,794

(22) Filed: Dec. 16, 2019

(65) Prior Publication Data
US 2020/0200215 A1    Jun. 25, 2020

(30) Foreign Application Priority Data
Dec. 21, 2018  (KR) .......................... 10-2018-0167277

(51) Int. Cl.
*F16C 19/52* (2006.01)
*F16C 27/04* (2006.01)
(Continued)

(52) U.S. Cl.
CPC ............ *F16C 27/04* (2013.01); *F16C 19/522* (2013.01); *F16C 35/077* (2013.01); *G01M 13/045* (2013.01); *F16C 2202/36* (2013.01)

(58) Field of Classification Search
CPC ...... F16C 19/525; F16C 19/527; F16C 27/04; F16C 27/066; F16C 35/077; F16C 2202/045; G01M 13/045
See application file for complete search history.

(56) References Cited

U.S. PATENT DOCUMENTS 5,221,146 A * 6/1993  Maruyama ............ F16F 15/005
                                                  384/519
5,677,488 A * 10/1997 Monahan ............... F16C 19/527
                                                  73/660

(Continued)

FOREIGN PATENT DOCUMENTS

DE   102006028294 A1 * 12/2007  ............ F16C 19/522
JP      2008106910 A  *  5/2008  ............ F16C 19/527

(Continued)

OTHER PUBLICATIONS

"Sensor bearing units", SKF, <https://www.skf.com/us/products/bearings-units-housings/engineered-products/sensorbearing-units/>.

(Continued)

*Primary Examiner* — Phillip A Johnson
(74) *Attorney, Agent, or Firm* — Cantor Colburn LLP

(57) ABSTRACT

Provided is a fractal structure for power-generation of bearing rotating vibration that is installed on an outer ring of a bearing to generate power using vibration generated from a micro whirling motion of the bearing, the fractal structure including a housing which is in contact with the outer ring of the bearing to receive the vibration generated from the micro whirling motion of the bearing, and has a receiving space therein, a flexible element which is disposed in the receiving space while being in contact with an inner circumference of the housing to convert the vibration into a radial direction, and a piezoelectric element which is installed between the housing and the flexible element and disposed near the receiving space, and deforms upon receiving the vibration converted in the radial direction from the flexible element, thereby producing electricity.

8 Claims, 8 Drawing Sheets

(51) Int. Cl.
*F16C 35/077* (2006.01)
*G01M 13/045* (2019.01)

(56) References Cited

U.S. PATENT DOCUMENTS

| | | | | |
|---|---|---|---|---|
| 7,654,746 | B2* | 2/2010 | Ladra | F16F 15/02 |
| | | | | 384/490 |
| 9,837,937 | B2 | 12/2017 | Kim et al. | |
| 11,156,531 | B2* | 10/2021 | Sami | G01H 1/003 |
| 2011/0150372 | A1* | 6/2011 | Care | F16C 27/04 |
| | | | | 384/1 |
| 2016/0187226 | A1* | 6/2016 | Tsutsui | G01M 13/045 |
| | | | | 73/593 |

FOREIGN PATENT DOCUMENTS

| | | |
|---|---|---|
| KR | 101107721 B1 | 1/2012 |
| KR | 1020120037702 A | 4/2012 |
| KR | 101217128 B1 | 12/2012 |
| KR | 1020150004849 A | 1/2015 |
| KR | 1020150145773 A | 12/2015 |
| WO | 2013160053 A1 | 10/2013 |

OTHER PUBLICATIONS

Brian T. Holm-Hansen et al., "Vibration Analysis of a Sensor-Integrated Ball Bearing," Journal of Vibration and Acoustics, Oct. 2000, pp. 384-392, vol. 122.

Dustin M. Etchison, "The Impact of Equipment Reliability on Human Safety," Oct. 20, 2017, <https://production-technology.org/the-impact-of-equipment-reliability-on-human-safety/>.

Fredrik Haggstrom, "Energy Harvesting for Smart-Internet-Connected Bearings," Lulea University of Technology, Department of Computer Science, Electrical and Space Engineering, 2015.

Justin J. Scheidler et al., "A review of noise and vibration control technologies for rotorcraft transmissions," inter noise, 2016, 12 pages.

Majid Taghavi et al., "Triboelectric smart machine elements and self-powered encoder," Nano Energy, 2015, pp. 92-102, vol. 13.

Sangjin Lee et al., "Development of Contact Pressure Analysis Model of Automobile Wiper Blades," Transaction of the Korean Society of Automotive Engineers, 2015, pp. 292-298, vol. 23, No. 3.

Vivake M. Asnani et al., "The Vibration Ring—Seedling Fund Phase 1 Final Report," National Aeronautics and Space Administration, Jun. 2014.

* cited by examiner

FRACTAL STRUCTURE FOR POWER-GENERATION OF BEARING ROTATING VIBRATION

DESCRIPTION OF GOVERNMENT-FUNDED RESEARCH AND DEVELOPMENT

This research is supported by individual basic research (MSIP, core technology development for extreme environment ball bearings with improved reliability and smart ball bearings, No. 1711058623) in the National Research Foundation of Korea, the Ministry of Science and ICT of the Republic of Korea, under the supervision of Korean Institute of Science and Technology.

CROSS-REFERENCE TO RELATED APPLICATION

This application claims priority to Korean Patent Application No. 10-2018-0167277, filed on Dec. 21, 2018, and all the benefits accruing therefrom under 35 U.S.C. § 119, the contents of which in its entirety are herein incorporated by reference.

BACKGROUND

1. Field

The present disclosure relates to a fractal structure, and more particularly, to a fractal structure which damps vibrations by micro whirling motions of a bearing and improves the power generation efficiency using the generated vibrations.

2. Description of the Related Art

With the industrial development, rotating machinery moves toward smaller size and higher speed. In keeping up with this trend, reliability and stability requirements of bearings are stricter, and many studies are being made to meet the requirements. Particularly, the field of industry has a tendency of research and development from preventive maintenance technology to predictive maintenance technology to improve system reliability and stability and reduce maintenance and repair costs.

The rotating shaft of rotating machinery essentially has a dynamic equivalent radial load due to imbalance mass, misalignment and sag from Gravity when the rotating shaft rotates. In a physical sense, this is equal to the centrifugal force, and appears as whirling motions of the rotating shaft. Because the actual centrifugal force increases in proportion to the square of the rotational speed of the rotating shaft, in the case of a high-speed rotating body, it is important to reduce the centrifugal force, and the standard for quantitative evaluation is specified in ISO-1940. Because the centrifugal force is energy wasted in rotating machinery, various methods for energy recovery are used, and studies using PZT are made in recent years.

Additionally, there are earlier models for diagnosis of the state of a general ball bearing by inserting a sensor into the bearing. Because a general ball bearing holds and rotates with the rotating shaft, it is difficult to predict the state of the bearing. Accordingly, when a sensor is mounted on the outer side of the outer ring, it is possible to monitor the state of the bearing in real time, and accordingly, a user can see the state of the bearing and prevent damage of rotating machinery.

An example is a sensor module mounted in motors and automobile brake systems using bearings to detect motions. This module can provide users with real-time monitoring systems, but it requires an electrical wire for power supply and a wire for data transmission. By this reason, there are limitations resulting from the system design when using by mounting in bearings present within rotating systems. Additionally, currently available sensor modules only detect motions (on/off), so there is a need for development of a sensor module for transmitting kinetic information about the state of the bearing.

Vibration rings are known, and a vibration ring largely includes an inner ring and an outer ring assembled with an outer ring of a bearing, spacers to convert radial relative replacement of the inner ring and the outer ring to axial replacement and PZT between the upper and lower spacers. When the inner ring gets closer to the outer ring by the radial forces of the bearing, the PZT is compressed by deformation of the spacers. Because the radial force cycle of the bearing is equal to the rotation frequency of the rotating shaft, the PZT is compressed and returns to the original length repeatedly according to the rotation frequency of the rotating shaft. This deformation provides the bearing with structural damping and reduces noise of rotating machinery. In addition, electricity is produced by repeated deformation of the PZT, and electricity can be identified through a pre-designed electric circuit.

However, in the presented structure of the vibration ring, because the upper and lower spacers are assembled with the inner ring and the outer ring of the vibration ring using bolts, twisting motions may occur according to the magnitude of the load and thus the radial forces cannot be fully provided to the PZT. Additionally, with the increasing radial forces, the compression forces applied to the PZT keep increasing. Accordingly, when the forces go beyond the level that the PZT can withstand, the PZT may be damaged. Besides, the upper and lower spacers have a structure that is vulnerable to plastic deformation in response to the radial forces. Additionally, because the shape is complex and the manufacturing efficiency is low, the range of applications is limited.

SUMMARY

The present disclosure is directed to providing a fractal structure which damps vibrations by micro whirling motions of a bearing and improves the power generation efficiency using the generated vibrations.

The present disclosure is designed to solve the above-described problem, and a fractal structure of the present disclosure is a fractal structure for power-generation of bearing rotating vibration that is installed on an outer ring of a bearing to generate power using vibration generated from a micro whirling motion of the bearing, the fractal structure including a housing which is in contact with the outer ring of the bearing to receive the vibration generated from the micro whirling motion of the bearing, and has a receiving space therein, a flexible element which is disposed in the receiving space while being in contact with an inner circumference of the housing to convert the vibration into a radial direction, and a piezoelectric element which is installed between the housing and the flexible element and disposed near the receiving space, and deforms upon receiving the vibration converted in the radial direction from the flexible element, thereby producing electricity.

According to an example related to the present disclosure, the flexible element may include a first element which is formed in an arc shape and installed in the piezoelectric element with two ends being connected to one surface of the housing, and a second element which is formed in an arc shape and disposed in contact between the first element and the other surface of the housing.

A plurality of piezoelectric elements may be provided, the plurality of piezoelectric elements may be arranged in the housing, spaced apart from each other, a plurality of first elements may be provided, the plurality of first elements may be spaced apart from each other and have two ends each installed in the plurality of piezoelectric elements, a plurality of second elements may be provided, and the plurality of second elements may have two ends in contact with adjacent first elements.

Two ends of the second element may be in contact with part between two ends of the first element, and part between the two ends of the second element may be in contact with the other surface of the housing.

According to an example related to the present disclosure, the receiving space may be formed along a circumferential direction, and the first and second elements may be repeatedly arranged in the circumferential direction within the receiving space.

The receiving space may be formed along the circumferential direction, and the first and second elements may be arranged in the circumferential direction and a direction perpendicular to the circumferential direction within the receiving space.

The piezoelectric element may be electrically connected to a vibration detection sensor which detects the vibration of the bearing, and the vibration detection sensor may allow self-power generation upon receiving the electricity produced from the piezoelectric element.

An outer ring of the housing may have a step in which the first element gets stuck in one surface of the outer ring, and the first element has a piezoelectric support at an end, wherein the piezoelectric support gets stuck in the step and extends in a tangential direction to support the piezoelectric element.

DETAILED DESCRIPTION

Hereinafter, the disclosed embodiments will be described in detail with reference to the accompanying drawings, and identical or similar elements are given identical or similar reference signs and redundant descriptions are omitted herein. As used herein, the suffix "part" in the elements is only given or used to ease the drafting of the specification, and does not have any meaning or role for distinguishing one from another itself. Additionally, in describing the embodiments disclosed herein, when a certain detailed description of relevant known technology is determined to render the key subject matter of the disclosed embodiments ambiguous, the detailed description is omitted herein. Additionally, the accompanying drawings are provided for an easy understanding of the disclosed embodiments, and the technical spirit disclosed herein is not limited by the accompanying drawings, and it should be understood that the present disclosure covers all modifications, equivalents or alternatives within the spirit and technical scope of the present disclosure.

The terms "first", "second", and the like may be used to describe various elements, but the elements are not limited by the terms. These terms are used to distinguish one element from another.

It will be further understood that when an element is referred to as being "connected to" another element, it can be directly connected to the other element or intervening elements may be present.

As used herein, the singular forms are intended to include the plural forms as well, unless the context clearly indicates otherwise.

It will be understood that the term "comprises" or "includes" when used in this specification, specifies the presence of stated features, integers, steps, operations, elements, components or groups thereof, but does not preclude the presence or addition of one or more other features, integers, steps, operations, elements, components, or groups thereof.

Figure 1:
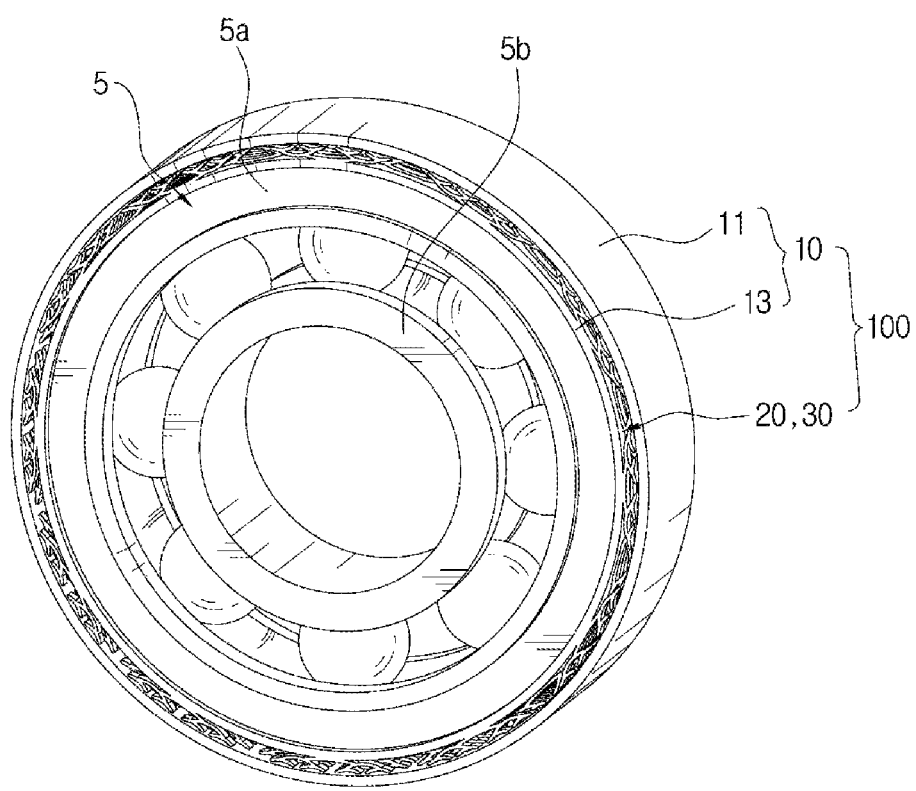
FIG. 1 is a perspective view showing an example of a fractal structure of the present disclosure installed in a ball bearing.
Figure 2:
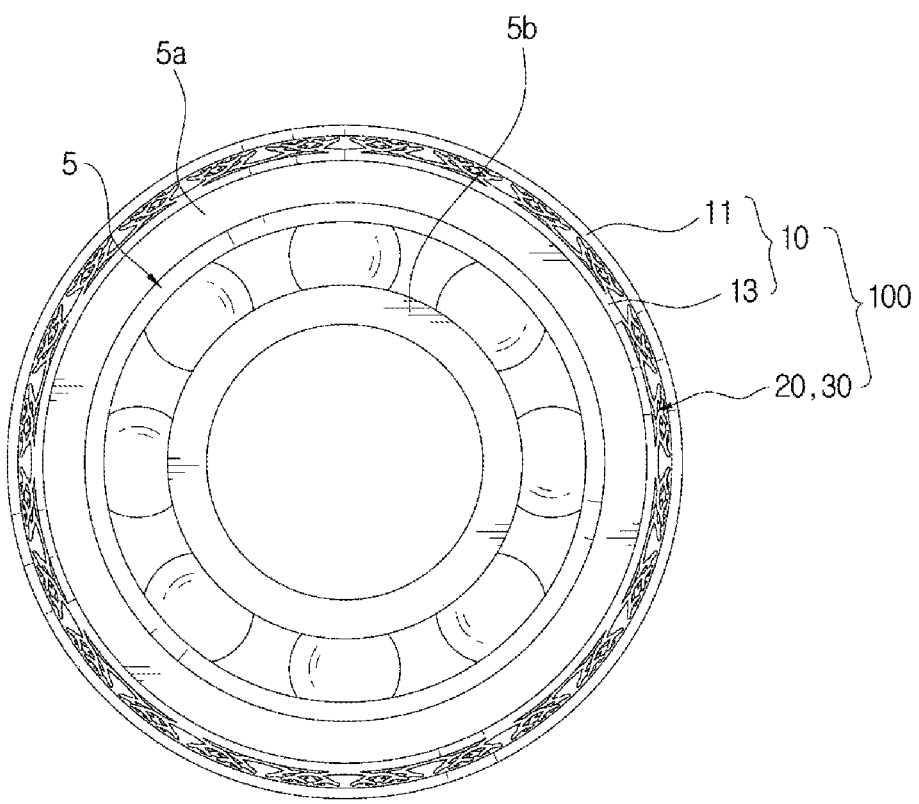
FIG. 2 is a front view showing an example of a fractal structure of the present disclosure installed in a ball bearing.
Figure 3:
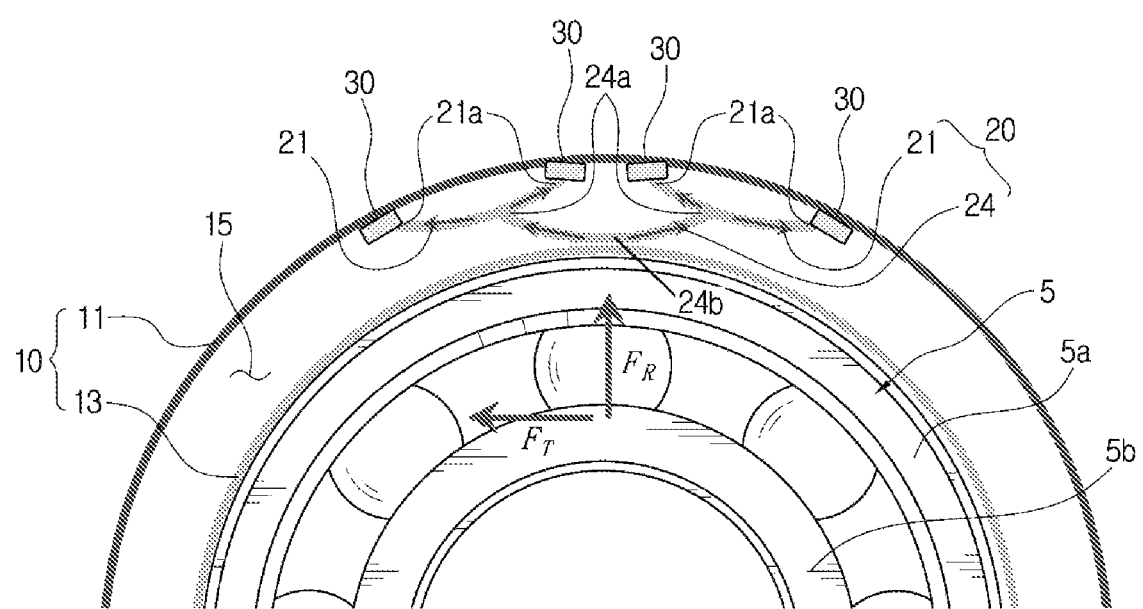
FIG. 3 is a cross-sectional view showing parts of a flexible element and a piezoelectric element of a fractal structure of the present disclosure.
Figure 4:
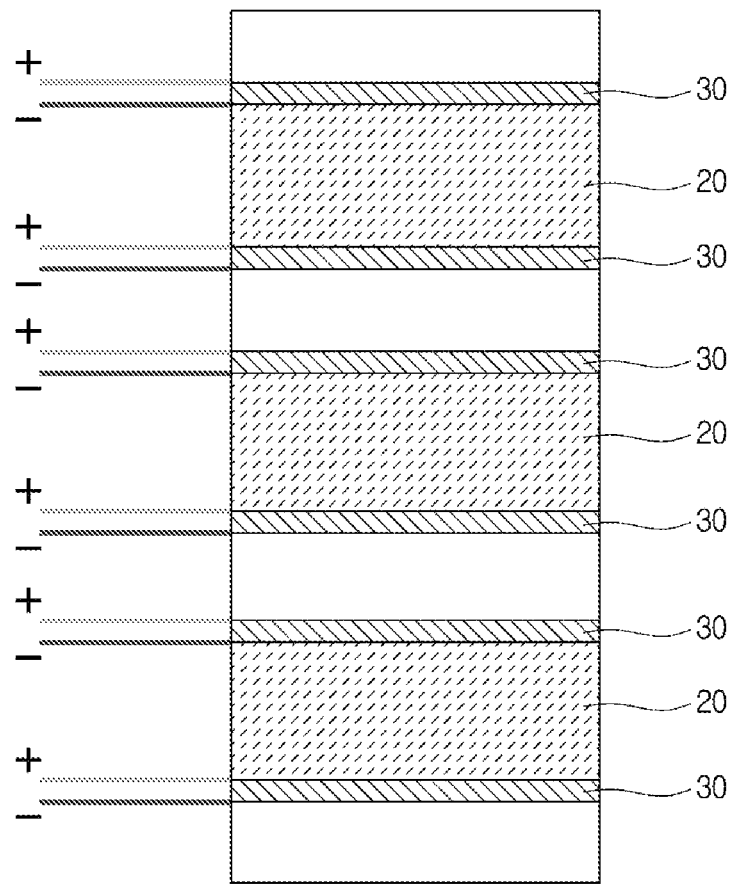
FIG. 4 is a side cross-sectional view showing a positional relationship between a flexible element and a piezoelectric element of a fractal structure of the present disclosure.

FIG. 1 is a perspective view showing an example of a fractal structure 100 of the present disclosure installed in a ball bearing 5, FIG. 2 is a front view showing an example of the fractal structure 100 of the present disclosure installed in the ball bearing 5, and FIG. 3 is a cross-sectional view showing parts of a flexible element 20 and a piezoelectric element 30 of the fractal structure 100 of the present disclosure. Additionally, FIG. 4 is a side cross-sectional view showing a positional relationship between the flexible element 20 and the piezoelectric element 30 of the fractal structure 100 of the present disclosure.

The fractal structure 100 of the present disclosure will be described with reference to FIGS. 1 to 4.

The fractal structure 100 for power-generation of the bearing 5 rotating vibration according to the present disclosure is installed in the outer ring 5a of the bearing 5 to generate power using vibrations generated from micro whirling motions of the bearing 5.

In the present disclosure, the bearing may be, for example, the ball bearing 5. The ball bearing 5 is connected to a rotating shaft and makes micro whirling motions by power transmitted from the rotating shaft. In the present disclosure, however, the bearing is not necessarily limited to the ball bearing 5 and may be various bearings that generate vibrations by micro whirling motions.

The fractal structure 100 of the present disclosure converts the vibrations transmitted from the bearing 5 to radial forces.

The fractal structure 100 of the present disclosure includes a housing 10, a flexible element 20 and a piezoelectric element 30.

The housing 10 is in contact with an outer ring 5a of the bearing 5 and receives the vibrations generated from the micro whirling motions of the bearing 5. For example, the housing 10 may be inserted into the outer ring 5a of the bearing 5. Additionally, the housing 10 has a receiving space 15 in which the flexible element 20 as described below is disposed.

As shown in FIG. 3, the housing 10 may include an outer ring 11 and an inner ring 13, and the receiving space 15 in which the flexible element 20 as described below is installed may be provided between the outer ring 11 and the inner ring 13.

Additionally, as shown in FIGS. 1 and 2, the housing 10 may be a ring structure, and may have a structure that is easy to insert it into the outer ring 5a of the bearing 5. When the housing 10 is a ring structure, the receiving space 15 may be formed in the circumferential direction of the bearing 5.

In this instance, the housing 10 may be made of a material having an elastic property to transmit the vibrations generated by the micro whirling motions of the bearing 5 while not being damaged by the vibrations.

The flexible element 20 is disposed in the receiving space 15 of the housing 10 and is in contact with the inner circumference of the housing 10, and receives the vibrations generated by the micro whirling motions of the bearing 5 and converts to the radial forces $F_T$, $F_R$ shown in FIG. 3. Additionally, the flexible element 20 damps the converted radial forces.

The detailed structure of the flexible element 20 will be described below.

The piezoelectric element 30 is installed between the housing 10 and the flexible element 20 and is disposed near the receiving space 15. For example, the piezoelectric element 30 may be in surface contact with the flexible element 20.

Additionally, the piezoelectric element 30 is configured to deform upon receiving the vibrations converted in the radial direction from the flexible element 20, thereby producing electricity.

Referring to FIG. 3, shown is an example of the piezoelectric element 30 installed between the inner circumference of the outer ring of the housing 10 and the first element 21.

Additionally, the piezoelectric element 30 may be installed in a holder (not shown) coupled to the outer ring of the housing 10. Although not clearly shown in FIG. 3, the holder may be inserted into the outer ring of the housing 10 near the receiving space 15, and when the piezoelectric element 30 is inserted into the holder, the piezoelectric element 30 may be installed in the housing 10. As the piezoelectric element 30 is coupled to the holder, it is possible to protect the piezoelectric element 30, and prevent the piezoelectric element 30 from sliding in the tangential direction from the receiving space 15 of the housing 10 and from being damaged.

A plurality of piezoelectric elements 30 may be provided, and the plurality of piezoelectric elements 30 may be arranged in the housing 10, spaced apart from each other.

For example, the piezoelectric element 30 produces electricity by compressive and tensile deformation in the radial direction upon receiving the vibrations transmitted from the bearing 5. Additionally, the piezoelectric element 30 may be electrically connected to a sensor or a communication module to supply the produced electricity to the sensor or the communication module.

On the other hand, when the piezoelectric element 30 does not need to produce electricity, the piezoelectric element 30 is used as an actuator upon receiving electricity, to convert damping forces at high speed in response to high frequency vibrations of the bearing 5.

For example, the piezoelectric element 30 may be PZT, but is not necessarily limited thereto, and may be various configurations that produce electricity while damping the vibrations generated from the bearing 5 by deformation upon receiving the radial forces.

The piezoelectric element 30 may be also electrically connected to a vibration detection sensor (not shown), and the vibration detection sensor is a sensor for detecting the vibrations of the bearing. The vibration detection sensor allows self-power generation upon receiving electricity produced by the piezoelectric element 30.

The flexible element 20 may include a first element 21 and a second element 24.

The first element 21 may be formed in an arc shape, and installed in the piezoelectric element 30 with two ends 21a being connected to one surface of the housing 10. For example, the first element 21 may be coupled in surface contact with the piezoelectric element 30.

Additionally, the second element 24 may be formed in an arc shape, and disposed in contact between the first element 21 and the other surface of the housing 10.

Two ends 24a of the second element 24 may be in contact with part between the two ends 21a of the first element 21, and part between the two ends 24a of the second element 24 may be in contact with the other surface of the housing 10.

Although FIG. 3 shows two first elements 21 and one second element 24 within the housing 10, but this is simply shown for understanding of the present disclosure, and as shown in FIGS. 1 and 2, the first and second elements 21, 24 may be formed with a structure that the first and second elements 21, 24 are repeatedly arranged along the direction of an arc.

Referring to FIG. 3, the plurality of first elements 21 is arranged in the receiving space 15 of the housing 10, spaced apart from each other, and shown is an example of the two ends 21a of the first element 21 in contact with the plurality of piezoelectric elements 30 and connected to the outer ring 11 of the housing 10. Additionally, FIG. 3 shows an example of the two ends 24a of the second element 24 in contact with adjacent first elements 21.

Referring to FIG. 3, a plurality of second elements 24 may be also provided, and the two ends 24 a of the plurality of second elements 24 may be in contact with adjacent first elements 21. Additionally, part 24b is disposed between the two ends 24 a of the second element 24 may be in contact with the inner ring 13 of the housing 10.

The first element 21 and the piezoelectric element 30, the first element 21 and the second element 24, and the second element 24 and the inner ring 13 of the housing 10 may be connected, for example, via fit coupling.

When the receiving space 15 of the housing 10 is formed in the circumferential direction, the first and second elements 21, 24 may be repeatedly arranged in the circumferential direction within the receiving space.

Additionally, when the receiving space 15 of the housing 10 is formed in the circumferential direction, the first and second elements 21, 24 may be arranged in the circumferential direction and a direction perpendicular to the circumferential direction within the receiving space 15.

Referring to FIGS. 1 and 2, shown is an example of the first and second elements 21, 24 arranged in the circumferential direction and a direction perpendicular to the circumferential direction within the receiving space 15 of the housing 10.

In this instance, the thickness, length and number of repetition of each of the first and second elements 21, 24 may be set, taking into account the intensity and direction of the whirling motion forces transmitted from the bearing 5, to ensure the structural stability of the entire system including the fractal structure 100 of the present disclosure and the bearing 5.

Figure 5:
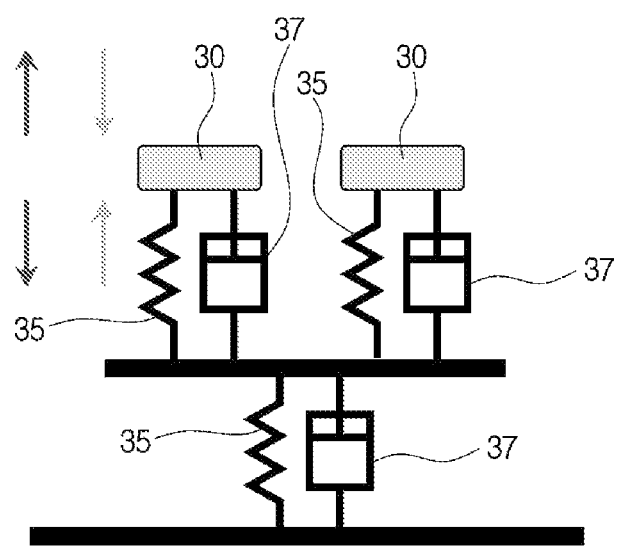
FIG. 5 is a conceptual diagram showing an elastic element and a damping element connected to a piezoelectric element.

FIG. 5 shows an example of an elastic element 35 and a damping element 37 connected to the piezoelectric element 30, and in the fractal structure 100 of the present disclosure, the flexible element 20 connected to the piezoelectric element 30 may be understood as the elastic element 35 that elastically transmits the vibrations generated from the micro whirling motions of the bearing and the damping element 37 that damps the vibrations in FIG. 5.

Figure 6A:
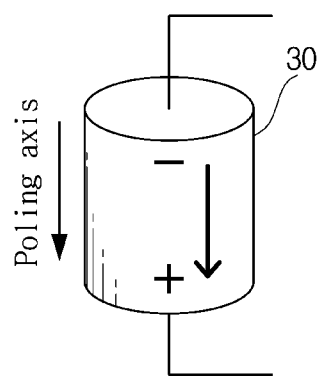
FIG. 6A is a conceptual diagram showing a piezoelectric element before deformation.
Figure 6B:
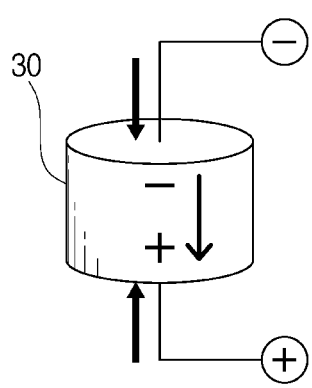
FIG. 6B is a conceptual diagram showing an example of a piezoelectric element in a state of compressive deformation.
Figure 6C:
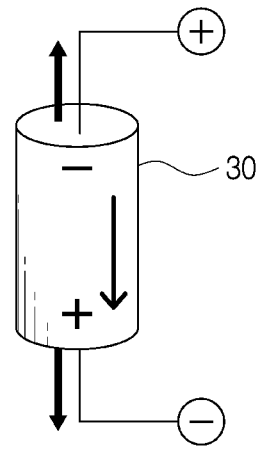
FIG. 6C is a conceptual diagram showing an example of a piezoelectric element in a state of tensile deformation.

FIG. 6A shows the piezoelectric element 30 before deformation, FIG. 6B shows the piezoelectric element 30 in a state of compressive deformation by the vibrations generated from the micro whirling motions of the bearing, and FIG. 6C shows the piezoelectric element 30 in a state of tensile compression by the vibrations generated from the micro whirling motions of the bearing.

Figure 7A:
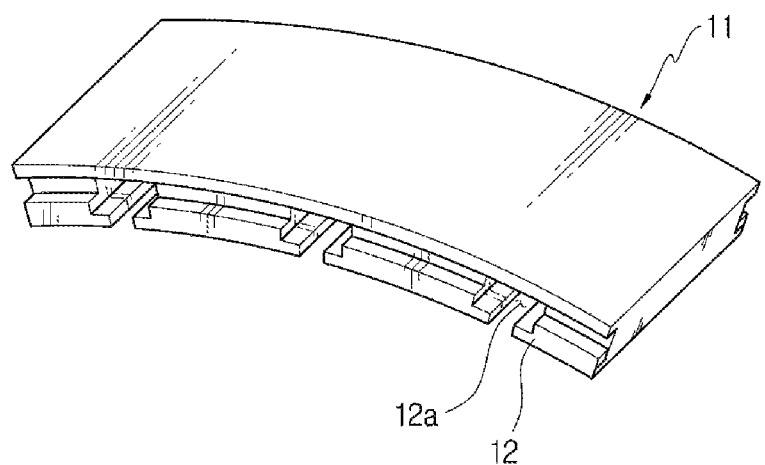
FIG. 7A is a perspective view showing an example of an outer ring of a housing.
Figure 7B:
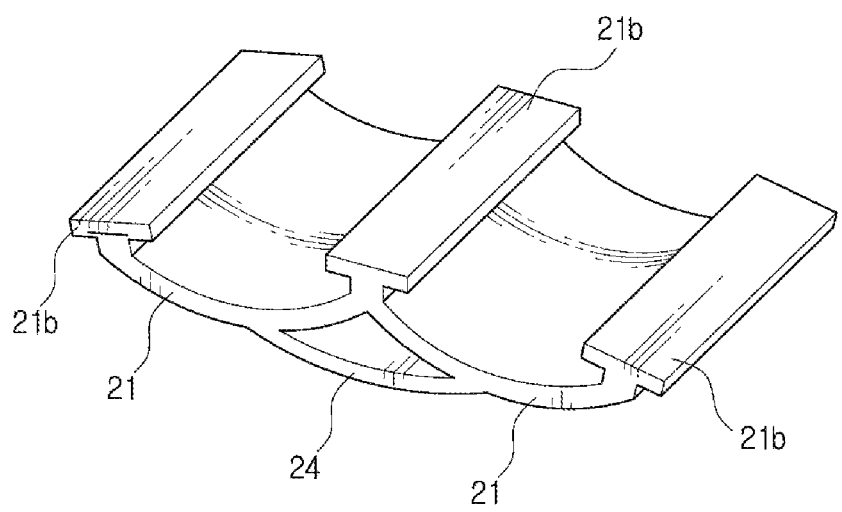
FIG. 7B is a perspective view showing an example of first and second elements of a flexible element.
Figure 8A:
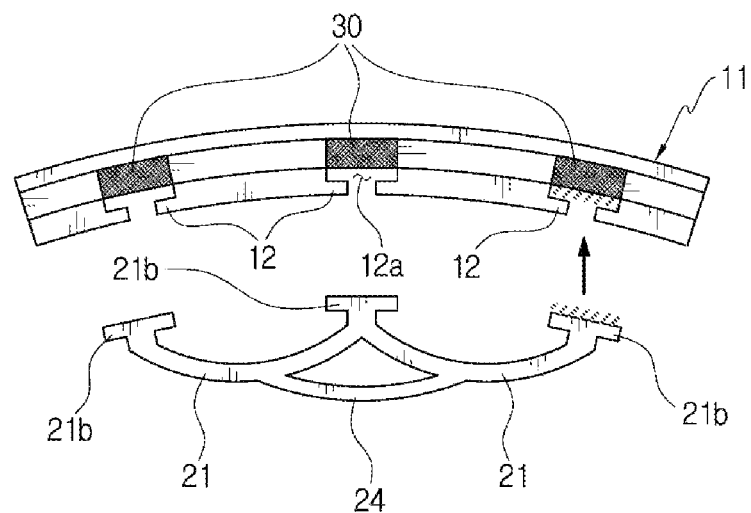
FIG. 8A is a conceptual diagram showing an example of installation of a flexible element in an outer ring of a housing.
Figure 8B:
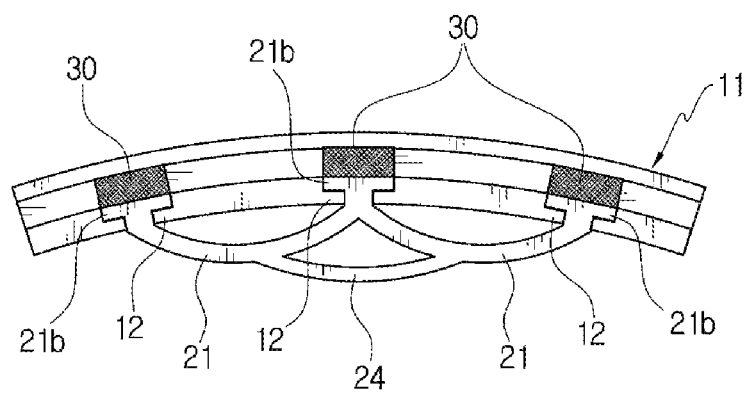
FIG. 8B is a conceptual diagram showing an example of a flexible element installed in an outer ring of a housing.

FIG. 7A is a perspective view showing an example of the outer ring 11 of the housing 10, and FIG. 7B is a perspective view showing an example of the first and second elements 21, 24 of the flexible element 20. Additionally, FIG. 8A is a conceptual diagram showing an example of installation of the flexible element 20 in the outer ring 11 of the housing 10, and FIG. 8B is a conceptual diagram showing an example of the flexible element 20 installed in the outer ring 11 of the housing 10.

Hereinafter, another example of the structure of the outer ring 11 of the housing 10 and the flexible element 20 and another example of the piezoelectric element 30 and the flexible element 20 installed in the outer ring 11 of the housing 10 will be described with reference to FIGS. 7A to 8B.

The outer ring 11 of the housing 10 may have a step 12 in which the first element 21 gets stuck in one surface of the outer ring 11. Additionally, a receiving part 12a may be formed on the inner side of the step 12 to receive the piezoelectric element 30 and the end of the first element 21.

Referring to FIG. 7B, the first element 21 may have a piezoelectric support 21b at the end. The piezoelectric support 21b may be formed in the tangential direction, and may be in contact with the lower surface of the piezoelectric element 30 to support the piezoelectric element 30.

Although FIGS. 7A to 8B only show the outer ring 11 of the housing 10 and the flexible element 20 corresponding to part of an arc, it may be understood that the shape is a circle extending along the circumferential direction in the same way as the housing 10 and the flexible element 20 shown in FIG. 2.

Referring to FIGS. 8A and 8B, shown is an installation example in which the piezoelectric element 30 is received in the receiving part 12a of the outer ring 11, and the piezoelectric support 21b of the first element 21 gets stuck in the step 12 to support the piezoelectric element 30. In FIG. 8A, the first element 21 may be coupled in the arrow direction, and the shaded areas may be understood as areas in which the vibrations of the bearing 5 are transmitted to the piezoelectric element 30.

The fractal structure of the present disclosure provides the bearing with spring stiffness and damping forces according to the vibrations generated by the whirling motions of the bearing.

The present disclosure allows self-power generation by the piezoelectric device and the arc-shaped flexible element arranged in a repetitive manner, and improves the power generation efficiency using bearing vibrations that is energy wasted in rotating systems.

The present disclosure enables the flexible element to fully transmit the radial and tangential forces by the micro vibrations of the bearing to the piezoelectric element within the housing in surface contact with the outer ring of the bearing, thereby minimizing energy losses and improving the power generation efficiency.

The present disclosure repeatedly transmits the vibrations of the bearing, produces electricity by radial compression and tension of the piezoelectric element inserted into the outer ring of the housing, adjusts the compression level of the piezoelectric device and the stiffness and the damping effect of the fractal structure through adjustment of the design parameters (thickness, curvature, length, number) of the flexible element, and removes a sliding force in the tangential direction through the holder, thereby preventing damage of the piezoelectric device.

The fractal structure 100 as described hereinabove is not limited to the configuration and method of the embodiments described above, and some or all the embodiments may be selectively combined to make various modification.

It is obvious to those skilled in the art that the present disclosure may be embodied in other particular forms without departing from the spirit and essential features of the present disclosure. Therefore, the above detailed description should not be interpreted as being limiting in all aspects and should be considered as being exemplary. The scope of the present disclosure should be determined by the reasonable interpretation of the appended claims, and the scope of the present disclosure covers all modifications within the equivalent scope of the present disclosure.

What is claimed is:

1. A fractal structure for power-generation of bearing rotating vibration that is installed on an outer ring of a bearing to generate power using vibration generated from a micro whirling motion of the bearing, the fractal structure comprising:
   a housing which is in contact with the outer ring of the bearing to receive the vibration generated from the micro whirling motion of the bearing, and has a receiving space therein;
   a flexible element which is disposed in the receiving space while being in contact with an inner circumference of the housing to convert the vibration into a radial direction; and
   at least one piezoelectric element which is installed between the housing and the flexible element and disposed near the receiving space, and deforms upon receiving the vibration converted in the radial direction from the flexible element, thereby producing electricity.

2. The fractal structure according to claim 1, wherein the flexible element comprises:
   a first element which is formed in an arc shape and installed in the piezoelectric element with two ends being connected to one surface of the housing; and
   a second element which is formed in an arc shape and disposed in contact between the first element and the other a second surface of the housing.

3. The fractal structure according to claim 1, wherein a plurality of piezoelectric elements is provided, and the plurality of piezoelectric elements is arranged in the housing, spaced apart from each other,
   a plurality of first elements is provided, and the plurality of first elements is spaced apart from each other and has two ends each installed in the plurality of piezoelectric elements, and
   a plurality of second elements is provided, and the plurality of second elements has two ends in contact with adjacent first elements.

4. The fractal structure according to claim 2, wherein two ends of the second element are in contact with a part between two ends of the first element, and a part between the two ends of the second element is in contact with the other surface of the housing.

5. The fractal structure according to claim 4, wherein the receiving space is formed along a circumferential direction, and
   the first and second elements are repeatedly arranged in the circumferential direction within the receiving space.

6. The fractal structure according to claim 4, wherein the receiving space is formed along the circumferential direction, and
   the first and second elements are arranged in the circumferential direction and a direction perpendicular to the circumferential direction within the receiving space.

7. The fractal structure according to claim 2, wherein an outer ring of the housing has a step in which the first element gets stuck in one surface of the outer ring, and the first element has a piezoelectric support at an end, wherein the piezoelectric support gets stuck in the step and extends in a tangential direction to support the piezoelectric element.

8. The fractal structure according to claim 1, wherein the piezoelectric element is electrically connected to a vibration detection sensor which detects the vibration of the bearing, and the vibration detection sensor allows self-power generation upon receiving the electricity produced from the piezoelectric element.

* * * * *